US011249535B2

United States Patent
Wang et al.

(10) Patent No.: US 11,249,535 B2
(45) Date of Patent: Feb. 15, 2022

(54) ELECTRONIC DEVICE AND SHUTDOWN METHOD BASED ON USER STATE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Zi-Jie Wang, Zhengzhou (CN); Jun-Wei Zhang, Zhengzhou (CN); Jun Zhang, Shenzhen (CN); Yi-Tao Kao, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 16/749,305

(22) Filed: Jan. 22, 2020

(65) Prior Publication Data

US 2021/0141439 A1    May 13, 2021

(30) Foreign Application Priority Data

Nov. 12, 2019  (CN) .......................... 201911101734.8

(51) Int. Cl.
*G06F 1/3231* (2019.01)
*G06F 9/4401* (2018.01)
*G06K 9/00* (2022.01)

(52) U.S. Cl.
CPC .......... *G06F 1/3231* (2013.01); *G06F 9/442* (2013.01); *G06K 9/00335* (2013.01)

(58) Field of Classification Search
CPC .... G06F 1/3231; G06F 9/442; G06K 9/00335
USPC ........................................................ 348/77
See application file for complete search history.

(56) References Cited

U.S. PATENT DOCUMENTS

| | | | | |
|---|---|---|---|---|
| 8,913,004 B1 * | 12/2014 | Bozarth | ................. | G09G 5/006 345/156 |
| 9,094,539 B1 * | 7/2015 | Noble | ...................... | G06K 9/00 |
| 2002/0135474 A1 * | 9/2002 | Sylliassen | ............. | G06F 1/3203 340/540 |

(Continued)

FOREIGN PATENT DOCUMENTS

JP         2013102870 A    *   5/2013

*Primary Examiner* — Christopher S Kelley
*Assistant Examiner* — Kathleen M Walsh
(74) *Attorney, Agent, or Firm* — ScienBiziP, P.C.

(57) ABSTRACT

A shutdown method of an electronic device includes detecting activity of a user; determining whether an activity range of the user is less than a predetermined value; determining whether the user is away from the electronic device when the activity range of the user is less than the predetermined value; capturing user images when the user is not away from the electronic device; determining whether any action has been performed by the user; determining whether the at least one action performed by the user matches a sleep habit when the at least one action has been performed by the user; and shutting down the electronic device when the user is away from the electronic device, or when no action has been performed by the user, or when the at least one action performed by the user match the sleep habit of the user.

12 Claims, 4 Drawing Sheets

(56) References Cited

U.S. PATENT DOCUMENTS

| | | | | |
|---|---|---|---|---|
| 2012/0297226 | A1* | 11/2012 | Mucignat | G06F 1/3203 |
| | | | | 713/323 |
| 2014/0247155 | A1* | 9/2014 | Proud | A61B 5/1118 |
| | | | | 340/870.16 |
| 2014/0361955 | A1* | 12/2014 | Goncalves | G02B 27/017 |
| | | | | 345/8 |
| 2015/0169053 | A1* | 6/2015 | Bozarth | G09G 5/006 |
| | | | | 345/156 |
| 2015/0324698 | A1* | 11/2015 | Karaoguz | G16H 50/50 |
| | | | | 706/46 |
| 2016/0022201 | A1* | 1/2016 | Arnold | A61B 5/4812 |
| | | | | 600/301 |
| 2016/0026241 | A1* | 1/2016 | Leung | H04M 1/72454 |
| | | | | 345/156 |
| 2017/0108236 | A1* | 4/2017 | Guan | H05B 47/105 |
| 2018/0106897 | A1* | 4/2018 | Shouldice | A61B 5/0507 |
| 2018/0348844 | A1* | 12/2018 | Lingutla | G06F 1/3231 |
| 2019/0129499 | A1* | 5/2019 | Li | G06F 3/0481 |
| 2019/0318608 | A1* | 10/2019 | Rao | G04G 21/04 |
| 2020/0217536 | A1* | 7/2020 | Guan | G05B 19/042 |

* cited by examiner

ELECTRONIC DEVICE AND SHUTDOWN METHOD BASED ON USER STATE

CROSS-REFERENCE TO RELATED APPLICATIONS

This application claims priority to Chinese Patent Application No. 201911101734.8 filed on Nov. 12, 2019, the contents of which are incorporated by reference herein.

FIELD

The subject matter herein generally relates to control of electronic devices, and particularly to an electronic device and a shutdown method based on user states.

BACKGROUND

When smart home appliances, such as smart TVs, smart water dispensers etc., are activated, users often forget to shut down when they fall asleep or go out. However, the home appliance is still running in these situations, which leads to waste of power.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
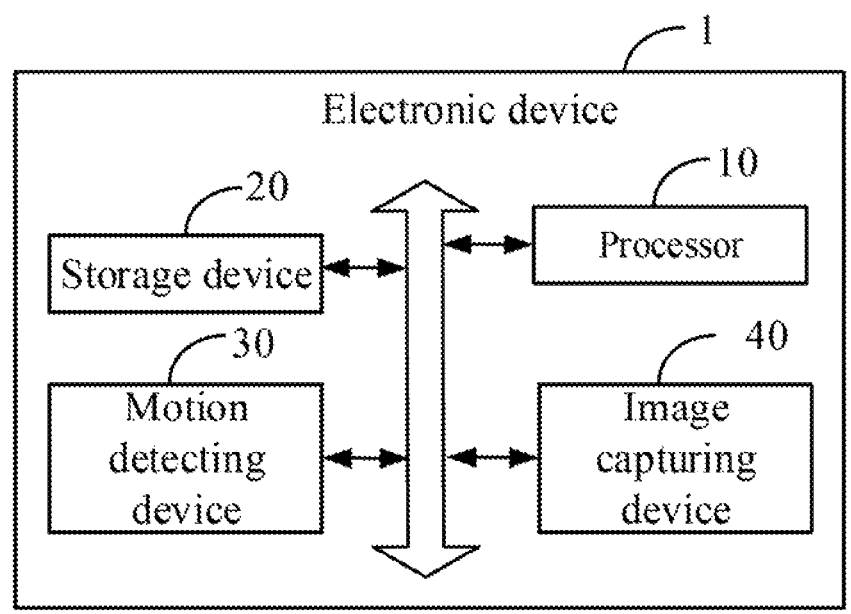
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an electronic device 1 in one embodiment. The electronic device 1 can be a smart TV, a smart water dispenser, or a personal computer. When the electronic device 1 is activated, the activities or behavior habits of a user are detected, to determine whether the user is using the electronic device 1. The electronic device 1 is shut down when the user is not using the electronic device 1, thereby saving power.

Figure 2:
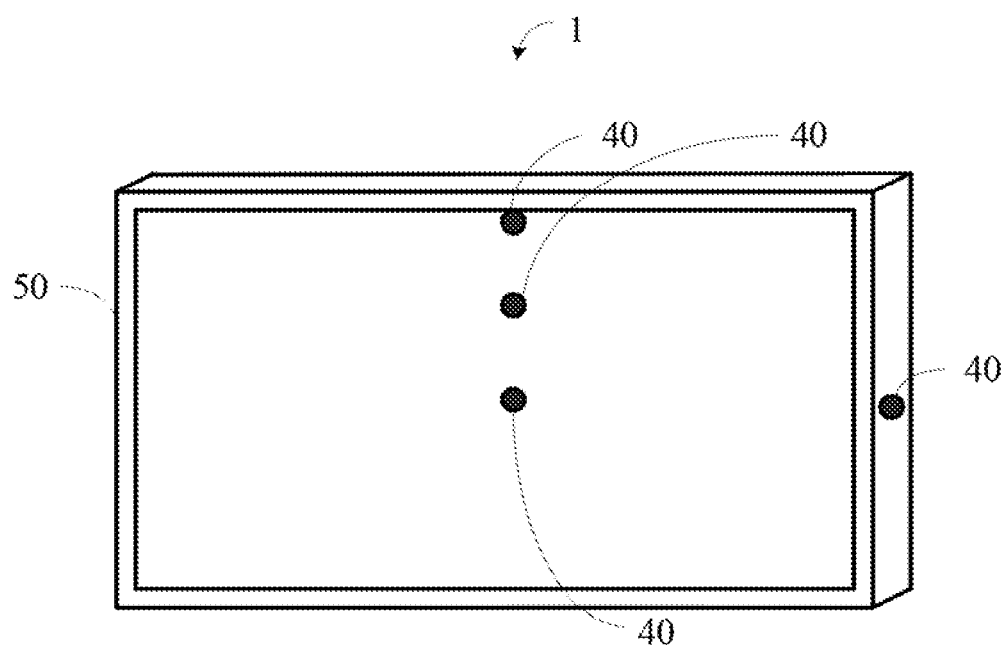
FIG. 2 is a schematic view of an embodiment of motion detecting device of the electronic device of FIG. 1.

The electronic device 1 includes, but is not limited to, a processor 10, a storage device 20, at least one motion detecting device 30, an image capturing device 40, and a casing 50 (shown in FIG. 2). FIG. 1 illustrates an example of the electronic device 1, other examples can include more or fewer components than illustrated, or have a different configuration of the various components in other embodiments.

The processor 10 can be a central processing unit (CPU), a microprocessor, or other data processor chip that performs functions of the electronic device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the motion detecting device 30 can be an infrared sensor or a pyroelectric infrared sensor.

Referring to FIG. 2, the electronic device 1 includes one or more motion detecting devices 30. In at least one embodiment, the casing 50 is substantially cuboid, and a number of motion detecting devices 30 are arranged in lateral and longitudinal directions of the casing 50.

In at least one embodiment, the electronic device 1 includes six motion detecting devices 30, four of the motion detecting device 30 are arranged in the lateral direction of the casing 50, and two of motion detecting device 30 are arranged in the longitudinal direction of the casing 50. In other embodiments, the number of the motion detecting devices 30 may be changed according to actual needs, positions of the motion detecting device 30 may also be changed according to actual needs.

In at least one embodiment, the image capturing device 40 can be a 360 degree camera. The image capturing device 40 captures images or video of surroundings at a proximity of the electronic device 1.

Figure 3:
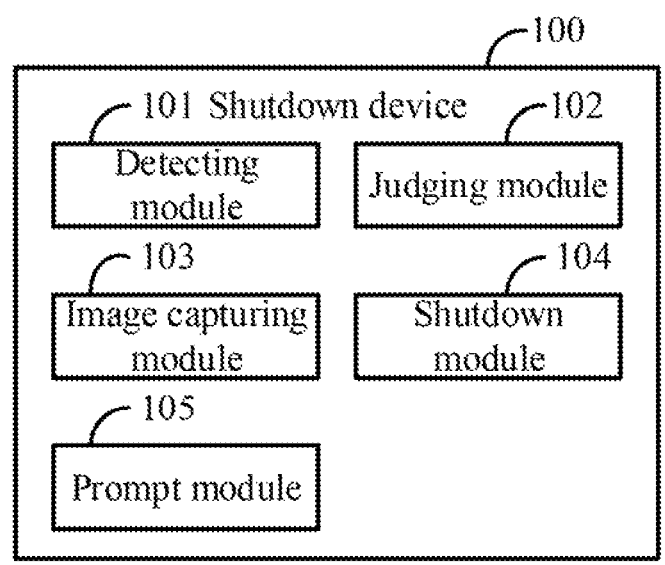
FIG. 3 is a block diagram of an embodiment of modules of a shutdown device in the electronic device of FIG. 1.

As illustrated in FIG. 3, the electronic device 1 runs a shutdown device 100. The shutdown device 100 at least includes a detecting module 101, a judging module 102, an image capturing module 103, a shutdown module 104, and a prompt module 105. The modules 101-105 can be collections of software instructions stored in the storage device 20 of the electronic device 1 and executed by the processor 10. The modules 101-105 also can include functionality represented as hardware or integrated circuits, or as software and hardware combinations, such as a special-purpose processor or a general-purpose processor with special-purpose firmware.

The detecting module 101 is used to control the motion detecting device 30 to detect activity of the user in a first predetermined time period, when the electronic device 1 is activated.

In at least one embodiment, the first predetermined time period can be three minutes. In other embodiments, the first predetermined time period can also be other suitable value.

In at least one embodiment, the motion detecting device 30 detects the activity of the user by detecting distances between the electronic device 1 and the user. In detail, the motion detecting device 30 transmits infrared rays, the infrared rays are reflected by the user's body. The motion detecting device 30 further receives reflected infrared rays. The distance between the electronic device 1 and the user can be calculated according a transmission speed of the infrared rays, and a time interval between transmitting the infrared rays and receiving the reflected infrared rays.

In other embodiments, when the electronic device 1 is activated, the detecting module 101 controls the motion detecting device 30 to detect the quantity of users at the proximity of the electronic device 1. When detecting that there is a single user at the proximity of the electronic device 1, the detecting device 101 controls the motion detecting device 30 to detect the activity of the single user in the first predetermined time period.

The motion detecting device 30 may be an infrared sensor or a pyroelectric infrared sensor. In detail, if the motion detecting device 30 is the infrared sensor, the number of users at the proximity of the electronic device 1 is detected by transmitting infrared rays and receiving reflected infrared rays. If the motion detecting device 30 is the pyroelectric infrared sensor, the number of users at the proximity of the electronic device 1 can be detected by sensing thermal radiation of bodies of the users.

The judging module 102 is used to determine whether an activity range of the user (as hereinafter defined) is less than a predetermined value according to the activity of the user detected by the detecting module 101.

In at least one embodiment, changing values of the distance between the electronic device 1 and the user is utilized as defining and representing the activity range of the user. The judging module 102 determines whether the changing values between the distances between the electronic device 1 and the user detected by each motion detecting device 30 within the first predetermined time period is less than the predetermined value.

In at least one embodiment, the change value can be a different value between a maximum value and a minimum value of the distance detected by the motion detecting device 30. For example, when the distances between the electronic device 1 and the user detected by a first motion detecting device 30 include 3 meters, 2.98 meters, and 3.01 meters, the change value can be 0.03 meters. When the distances between the electronic device 1 and the user detected by a second motion detecting device 30 include 3.05 meters, 2.99 meters, and 3.10 meters, the change value can be 0.06 meters.

In at least one embodiment, the predetermined value can be 0.05 meters. In other embodiments, the predetermined value can also be other suitable values.

The judging module 102 is further used to determine whether the user is away from the electronic device 1, when determining that the activity range of the user is less than the predetermined value in the first predetermined time period.

In at least embodiment, when the motion detecting device 30 does not detect any user at the proximity of the electronic device 1, the judging module 102 determines that the user is far from the electronic device 1. When the motion detecting device 30 detects user at the proximity of the electronic device 1, the judging module 102 determines that the user is not far from the electronic device 1.

In other embodiments, the judging module 102 can also control the image capturing device 40 to capture at least one image of the surroundings of the electronic device 1, and determine whether at least one human face is included in the at least one image captured by the image capturing device 40 by face recognition technology. When at least one human face is included in the image, the judging module 102 determines that the user is not far from the electronic device 1. When no human face is included in the image, the judging module 102 determines that the user is far from the electronic device 1.

The image capturing module 103 is used to control the image capturing device 40 to capture user images within a second predetermined time period, when the judging module 102 determines that the user is not away from the electronic device 1.

In at least one embodiment, the image capturing device 40 can capture a predetermined number of images of the user within the second predetermined time period. In at least one embodiment, the predetermined number can be five, and the second predetermined time period can be five minutes.

The judging module 102 is further used to determine whether any action has been performed by the user according to the user images captured by the image capturing device 40.

In at least one embodiment, the judging module 102 can recognized a body posture of the user in each captured user image, and compare the body postures shown in the captured user images. When the body posture in at least one user image is different from the body postures of other images, the judging module 102 determines that at least one action has been performed by the user. When the body postures in all of the user image are the same, the judging module 102 determines that no action has been performed by the user.

The judging module 102 is further used to determine whether the at least one action performed by the user matches a sleep habit of the user, when the judging module 102 determines that at least one action has been performed by the user.

In at least one embodiment, the storage device 20 stores a database for recording the sleep habit of the user, and the database includes a number of action images of a sleep pattern of the user. In at least one embodiment, the electronic device 1 may acquire a number of action images by capturing usual sleep habit of the user, and further establish the database. In other embodiments, a number of action images may be stored by the user.

In detail, the judging module 102 compares the captured user images with a number of action images of the sleep pattern. When the at least one user image is identical with at least one of a number of action images, the judging module 102 determines that the at least one action performed by the user matches the sleep habit of the user. When the at least one user image is not identical with all of the action images, the judging module 102 determines that the at least one action performed by the user does not match the sleep habit of the user.

The shutdown module 104 is used to shut down the electronic device 1, when the judging module 102 determines that the user is away from the electronic device 1, or when the judging module 102 determines that no action has been performed by the user, or when the judging module 102 determines that the at least one action performed by the user matches the sleep habit of the user.

When the judging module 102 determines that the activity range of the user is not less than a predetermined value, or when the judging module 102 determines that the at least one action performed by the user does not match the sleep habit of the user, the shutdown module 104 does not shut down the electronic device 1, the electronic device 1 continues to operate.

When the determining module 102 determines that the user is away from the electronic device 1, or when the judging module 102 determines that no action has been performed by the user, or when the judging module 102 determines that the at least one action performed by the user matches the sleep habit of the user, the prompt module 105 is used to output a message.

In at least one embodiment, the message is output to warn the user that electronic device 1 is going to shut down. In at least one embodiment, the message can be a text message which is displayed on an interface of the electronic device 1. For example, the prompt module 105 can control the electronic device 1 to output a pop-up text message including content "Going to shut down" and an option to cancel the shutdown. In other embodiments, the message also can be a soft voice message output by the electronic device 1. For example, the voice message includes content "shutdown imminent". In other embodiments, the prompt module 105 can output the text message and the voice message at the same time.

The judging module 102 is further used to determine whether the message is responded by the user within a third predetermined time period. The shutdown module 104 is further used to shut down the electronic device 1, when the judging module 102 determines that the message is not responded by the user within the third predetermined time period. The shutdown module 104 does not shut down the electronic device 1, when the judging module 102 determines that the message is responded by the user within the third predetermined time period. In at least one embodiment, the third predetermined time period can be one minute. In other embodiments, the third predetermined time period can be other suitable value.

When the electronic device 1 displays the pop-up text message on the interface, the user may trigger the option to cancel the shutdown within the third predetermined time period, thus, the electronic device 1 does not shut down.

When the electronic device 1 outputs the voice message, the user may reply to the voice message within the third predetermined time period, thus, the electronic device 1 does not shut down.

Figure 4:
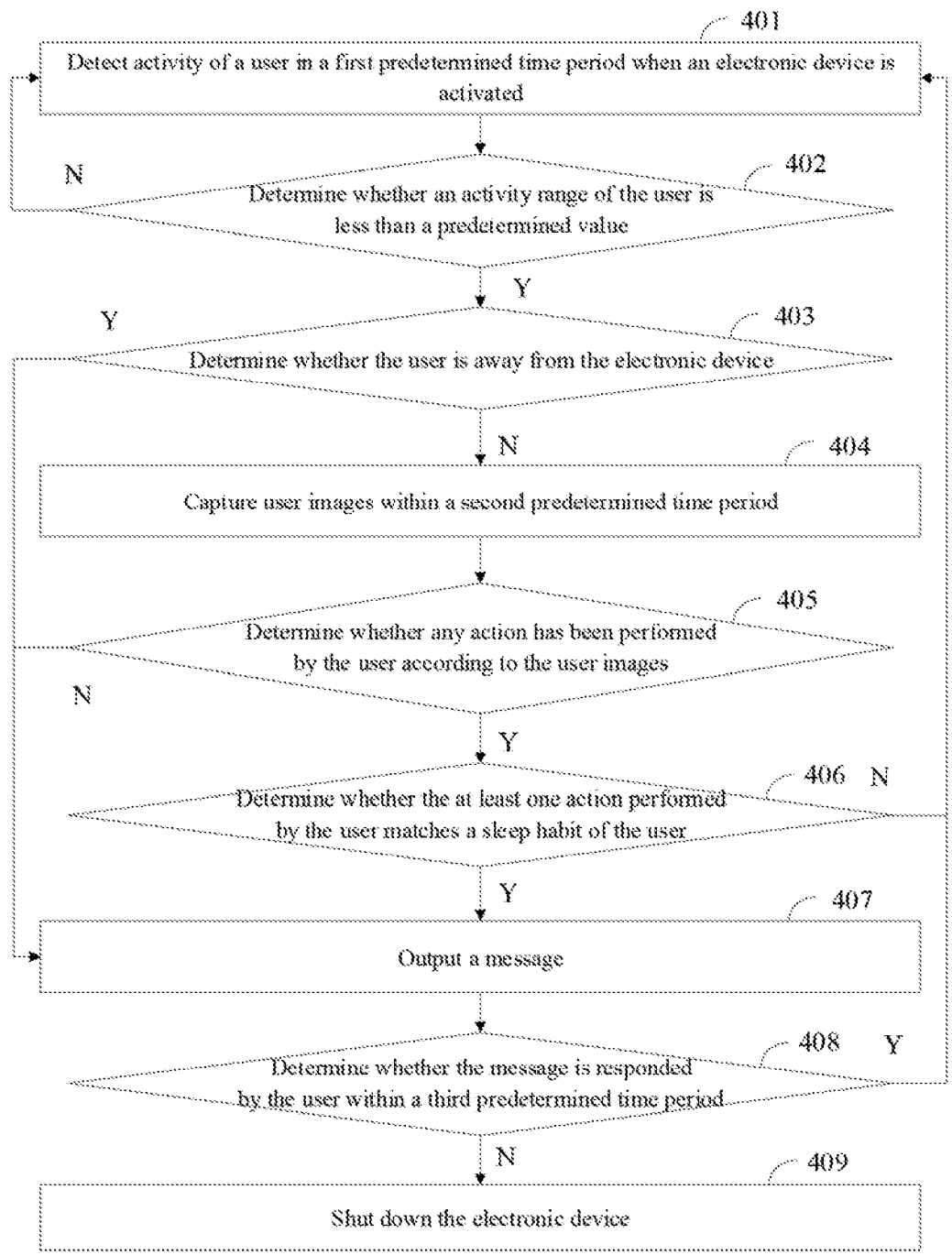
FIG. 4 illustrates a flowchart of an embodiment of a shutdown method.

FIG. 4 illustrates a flowchart of an embodiment of a shutdown method. The method is provided by way of example, as there are a variety of ways to carry out the method. The method described below can be carried out using the configurations illustrated in FIGS. 1 and 3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the detecting module 101 controls the motion detecting device 30 to detect activity of the user in a first predetermined time period, when the electronic device 1 is activated.

At block 402, the judging module 102 determines whether an activity range of the user is less than a predetermined value according to the activity of the user detected by the detecting module 101.

At block 403, the judging module 102 further determines whether the user is away from the electronic device 1, when determining that the activity range of the user is less than the predetermined value in the first predetermined time period.

At block 404, the image capturing module 103 controls the image capturing device 40 to capture user images within a second predetermined time period, when the judging module 102 determines that the user is not away from the electronic device 1.

At block 405, the judging module 102 further determines whether any action has been performed by the user according to the user images captured by the image capturing device 40.

At block 406, The judging module 102 is further used to determine whether the at least one action performed by the user matches a sleep habit of the user, when the judging module 102 determines that at least one action has been performed by the user.

At block 407, the prompt module 105 outputs a message.

At block 408, the judging module 102 further determines whether the message is responded by the user within a third predetermined time period.

At block 409, the shutdown module 104 shuts down the electronic device 1.

The shutdown method, and the shutdown device can detect the activity of the user, detect the user action, and shut down the electronic device when the user has no activity, or has a small range of activity, or fell asleep, or is away from the electronic device, thereby saving power.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor;
at least one motion detecting device coupled to the at least one processor;
an image capturing device coupled to the at least one processor; and
a storage device coupled to the at least one processor and storing instructions for execution by the at least one processor to cause the at least one processor to:
control, when the electronic device is activated, the at least one motion detecting device to detect activity of a user in a first predetermined time period;
determine whether an activity range of the user is less than a predetermined value according to the detected activity of the user;

determine whether a change value between distances between the electronic device and the user detected by each of the at least one motion detecting device within the first predetermined time period is less than the predetermined value;

determine, when the change value between the distances between the electronic device and the user detected by each of the at least one motion detecting device within the first predetermined time period is less than the predetermined value, that the activity range of the user is less than the predetermined value in the first predetermined time period;

determine, when the activity range of the user is determined to be less than the predetermined value in the first predetermined time period, whether the user is away from the electronic device;

control, when the user is determined to be not away from the electronic device, the image capturing device to capture user images within a second predetermined time period;

determine whether any action has been performed by the user according to the user images captured by the image capturing device;

determine, when determined that at least one action has been performed by the user, whether the at least one action performed by the user matches a sleep habit of the user; and shut down the electronic device, when the user is determined to be away from the electronic device, or when determined that no action has been performed by the user, or when the at least one action performed by the user is determined to match the sleep habit of the user.

2. The electronic device according to claim 1, wherein the at least one processor is further caused to:

control the at least one motion detecting device to detect a quantity of users at a proximity of the electronic device; and control, when detecting that there is a single user at the proximity of the electronic device, the at least one motion detecting device to detect the activity of the user in the first predetermined time period.

3. The electronic device according to claim 1, wherein the at least one processor is further caused to:

compare the captured user images with a plurality of action images of a sleep pattern stored in a database; and determine, when at least one of the captured user images is identical with at least one of the action images, that the at least one action performed by the user matches the sleep habit of the user.

4. The electronic device according to claim 1, wherein the at least one processor is further caused to:

output a message, when the user is determined to be away from the electronic device, or when determined that no action has been performed by the user, or when the at least one action performed by the user is determined to match the sleep habit of the user;

determine whether the message is responded by the user within a third predetermined time period; and shut down the electronic device, when the message is determined to be not responded by the user within the third predetermined time period.

5. A shutdown method for an electronic device comprising:

controlling, when the electronic device is activated, at least one motion detecting device to detect activity of a user in a first predetermined time period;

determining whether an activity range of the user is less than a predetermined value according to the detected activity of the user;

determining whether a change value between distances between the electronic device and the user detected by each of the at least one motion detecting device within the first predetermined time period is less than the predetermined value;

determining, when the change value between the distances between the electronic device and the user detected by each of the at least one motion detecting device within the first predetermined time period is less than the predetermined value, that the activity range of the user is less than the predetermined value in the first predetermined time period;

determining, when determined that the activity range of the user is less than the predetermined value in the first predetermined time period, whether the user is away from the electronic device;

controlling, when the user is determined to be not away from the electronic device, an image capturing device to capture user images within a second predetermined time period;

determining whether any action has been performed by the user according to the user images captured by the image capturing device;

determining, when determined that at least one action has been performed by the user, whether the at least one action performed by the user matches a sleep habit of the user; and shutting down the electronic device, when the user is determined to be away from the electronic device, or when determined that no action has been performed by the user, or when the at least one action performed by the user is determined to match the sleep habit of the user.

6. The method according to claim 5, further comprising:

controlling the at least one motion detecting device to detect a quantity of users at a proximity of the electronic device; and controlling, when detecting that there is a single user at the proximity of the electronic device, the at least one motion detecting device to detect the activity of the user in the first predetermined time period.

7. The method according to claim 5, wherein steps of determining whether the at least one action performed by the user matches a sleep habit of the user comprise:

comparing the captured user images with a plurality of action images of a sleep pattern stored in a database; and determining, when at least one of the captured user images is identical with at least one of the action images, that the at least one action performed by the user matches the sleep habit of the user.

8. The method according to claim 5, further comprising:

outputting a message, when the user is determined to be away from the electronic device, or when determined that no action has been performed by the user, or when the at least one action performed by the user is determined to match the sleep habit of the user;

determining whether the message is responded by the user within a third predetermined time period; and shutting down the electronic device when the message is determined to be not responded by the user within the third predetermined time period.

9. A non-transitory storage medium having instructions stored thereon, when the instructions are executed by a processor of an electronic device, the processor is configured to perform a shutdown method, wherein the method comprises:

controlling, when the electronic device is activated, at least one motion detecting device to detect activity of a user in a first predetermined time period;

determining whether an activity range of the user is less than a predetermined value according to the detected activity of the user;

determining whether a change value between distances between the electronic device and the user detected by each of the at least one motion detecting device within the first predetermined time period is less than the predetermined value;

determining, when the change value between the distances between the electronic device and the user detected by each of the at least one motion detecting device within the first predetermined time period is less than the predetermined value, that the activity range of the user is less than the predetermined value in the first predetermined time period;

determining, when determined that the activity range of the user is less than the predetermined value in the first predetermined time period, whether the user is away from the electronic device;

controlling, when the user is determined to be not away from the electronic device, an image capturing device to capture user images within a second predetermined time period;

determining whether any action has been performed by the user according to the user images captured by the image capturing device;

determining, when determined that at least one action has been performed by the user, whether the at least one action performed by the user matches a sleep habit of the user; and shutting down the electronic device, when the user is determined to be away from the electronic device, or when determined that no action has been performed by the user, or when the at least one action performed by the user is determined to match the sleep habit of the user.

10. The non-transitory storage according to claim 9, further comprising:

controlling the at least one motion detecting device to detect a quantity of users at a proximity of the electronic device; and controlling, when detecting that there is a single user at the proximity of the electronic device, the at least one motion detecting device to detect the activity of the user in the first predetermined time period.

11. The non-transitory storage according to claim 9, wherein steps of determining whether the at least one action performed by the user matches a sleep habit of the user comprise:

comparing the captured user images with a plurality of action images of a sleep pattern stored in a database; and determining, when at least one of the captured user images is identical with at least one of the action images, that the at least one action performed by the user matches the sleep habit of the user.

12. The non-transitory storage according to claim 9, further comprising:

outputting a message, when the user is determined to be away from the electronic device, or when determined that no action has been performed by the user, or when the at least one action performed by the user is determined to match the sleep habit of the user;

determining whether the message is responded by the user within a third predetermined time period; and shutting down the electronic device when the message is determined to be not responded by the user within the third predetermined time period.

* * * * *